United States Patent [19]

Weghaupt

[11] 4,013,908
[45] Mar. 22, 1977

[54] COOLING SYSTEM FOR A SUPERCONDUCTIVE EXCITER WINDING

[75] Inventor: Erich Weghaupt, Mulheim (Ruhr), Germany

[73] Assignee: Kraftwerk Union Aktiengesellschaft, Mulheim (Ruhr), Germany

[22] Filed: June 2, 1975

[21] Appl. No.: 583,159

[30] Foreign Application Priority Data

Mar. 13, 1975 Germany .......................... 2511104

[52] U.S. Cl. .................................. 310/61; 310/52; 310/59
[51] Int. Cl.$^2$ ......................................... H02K 1/20
[58] Field of Search ............................... 310/52–65

[56] References Cited

UNITED STATES PATENTS

| | | | |
|---|---|---|---|
| 3,249,775 | 5/1966 | Baylac | 310/64 X |
| 3,440,462 | 4/1969 | Willyoung | 310/61 |
| 3,517,231 | 6/1970 | Massar | 310/52 |
| 3,596,120 | 7/1971 | Potter | 310/61 |
| 3,597,645 | 8/1971 | Duffert et al. | 310/54 |
| 3,745,389 | 7/1973 | Lorch | 310/52 |

Primary Examiner—Donovan F. Duggan
Attorney, Agent, or Firm—Herbert L. Lerner

[57] ABSTRACT

Cooling system for a superconductive exciter winding in a turbogenerator rotor, the exciter winding having winding coils formed of a multiplicity of individual windings that are received in slots formed at the outer periphery of a solid support cylinder and retained therein by a bracing cylinder shrink-fitted on the support cylinder, includes coolant distribution channels disposed radially in teeth located between and defining the slot formed in the support cylinder and in filler members located between winding head coils, the coolant distribution channels surrounding the individual windings over the entire length thereof and being connected in peripheral direction on both sides thereof with coolant channels extending substantially parallel to one another in radial direction with the individual winding coils and surrounding the same at the bottom of the slots; and method of production.

4 Claims, 5 Drawing Figures

COOLING SYSTEM FOR A SUPERCONDUCTIVE EXCITER WINDING

The invention relates to a cooling system for a superconductive exciter winding in the rotor of a turbogenerator, the exciter winding having winding coils formed of a multiplicity of individual windings that are received in slots formed at the outer periphery of a solid support cylinder and retained thereon by a bracing cylinder shrink-fitted thereon.

A system of this type has already been proposed in my copending application Ser. No. 583,158 (F-6050) filed simultaneously with this application. According thereto, insulation plates are disposed on the lateral walls of the slots and are formed with cooling grooves open on the surfaces thereof facing toward the individual winding coils so as to cool the coils. Due to the long cooling path and the limited cross section of the cooling channel resulting from lack of space, this system of the copending application presents a high resistance to flow, however, and results in a high loss of flow with increased throughput or flow rate. Consequently, the cooling power or output of such an axial cooling system is very limited; it is adequate, it is true, for normal operation, since a superconducting exciter winding has only very small electrical losses therewith; however, during abnormal operating circumstances, such as an unbalanced load, a short circuit, and the like, considerably greater losses occur, so that the cooling system has to be correspondingly constructed to take that into account.

Since each cooling system has an optimal cooling output dependent upon the function thereof, which at given dimensions cannot be increased even by a forced coolant throughput or flow rate, a cooling system must be selected that has minimal flow losses and therefore maximally effective cooling power or output. This is of special significance for cooling systems for superconductive exciter windings, since the conventionally used superconductors operate in a very narrow temperature range of about 3° to 4.2° K, so that a temperature difference of only 1.2° for the coolant path is available from the cooling equipment through the rotor leads and the winding to the outlet of the winding. Effective utilization of the cooling system is already quite greatly reduced by heating due to high flow losses of only a few tenths of a degree.

It is accordingly an object of the invention to provide a cooling system which ensures optimal cooling power or output for minimal flow losses.

With the foregoing and other objects in view there is provided, in accordance with the invention, a cooling system for a superconductive exciter winding in a turbogenerator rotor, the exciter winding having winding coils formed of a multiplicity of individual windings that are received in slots formed at the outer periphery of a solid support cylinder and retained therein by a bracing cylinder shrink-fitted on the support cylinder, includes coolant distribution channels disposed radially in teeth located between and defining the slots formed in the support cylinder and in filler members located between winding head coils, the coolant distribution channels surrounding the individual windings over the entire length thereof and being connected in peripheral direction on both sides thereof with coolant channels extending substantially parallel to one another with uniform mutual spacing in radial direction with the individual winding coils and surrounding the same at the bottom of the slots.

In accordance with another feature of the invention, the coolant distribution channels, along the periphery of the support cylinder, are alternatingly constructed as coolant supply channels and coolant discharge channels.

In accordance with a further feature of the invention, the coolant channels surrounding the winding coils are formed at the inner side of a U-shaped lining of the slots.

In accordance with an additional feature of the invention, the slots are closed by slot-locking wedges at the periphery of the support cylinder, and the radially extending coolant distribution channels are connected through radial incisions formed at the periphery of the support cylinder and at edges of the slot-locking wedges to the coolant channels surrounding the winding coils.

Through such a cooling system according to the invention, only very slight flow losses occur in the coolant distribution channels surrounding the winding coils over the entire length thereof, one to the relatively large cross section that is available, while the radial cooling channels surrounding the winding coils and located between two neighboring coolant distribution channels are relatively short and accordingly are subject to relatively slight flow losses.

In accordance with the method of producing the cooling system for a superconductive exciter winding in a turbogenerator rotor according to the invention, wherein the exciter winding has winding coils formed of a multiplicity of individual windings that are received in slots formed at the outer periphery of a solid support cylinder, the individual windings are impregnated with resin after filling all of the coolant distribution channels and coolant channels with filler members free of play therein, and thereafter the impregnating resin is hardened.

Other features which are considered as characteristic for the invention are set forth in the appended claims.

Although the invention is illustrated and described herein as embodied in cooling system for a superconductive exciter winding and method of production, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
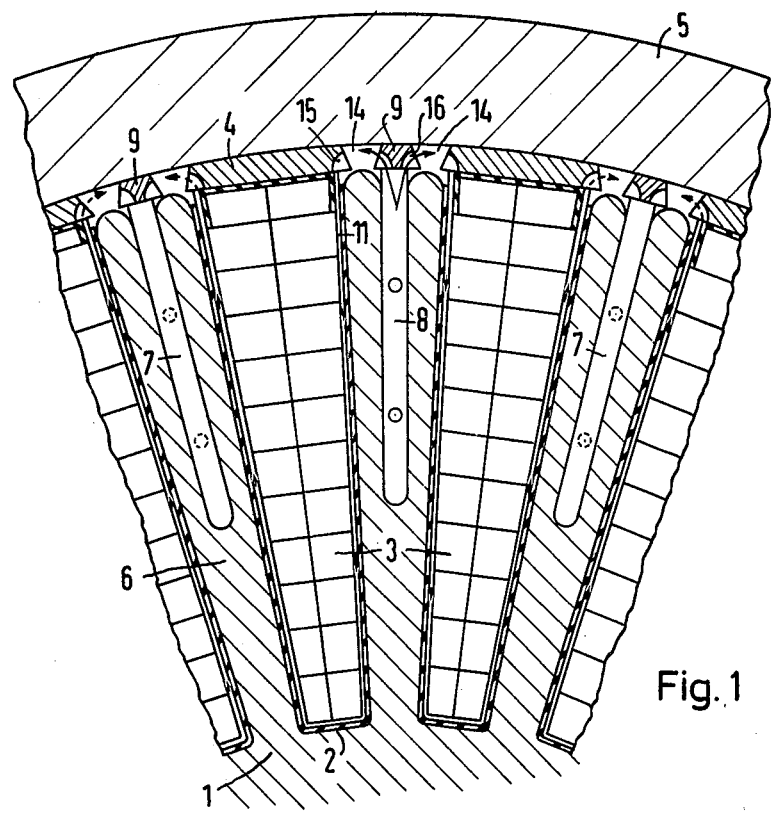
FIG. 1 is a partial cross-sectional view of a support cylinder with slots in which coils are wound and showing the course of the coolant.

Referring now to the drawings and first, particularly to the cross-sectional view in FIG. 1, there is shown a rotor of a turbogenerator having a solid carrier or support cylinder 1, in which radial slots 2 are milled at uniform spacing about the periphery of the support cylinder 1 for receiving a super conductive exciter winding 3 therein. These rotor slots 2 are closed, in fact at the open ends thereof by slot-locking wedges 4; they do not, however, assume any support function, but rather, for supporting the winding and bracing means with respect to the centrifugal forces occurring during operation, a bracing cylinder 5 shrink-fitted over the entire length of the support cylinder 1, all of the forces that are produced being absorbed by the bracing cylinder 5.

For cooling the individual winding coils, initially outwardly open coolant-distribution channels 7 and 8 are milled into the teeth 6 between the individual rotor slots 2. After completion, the outwardly open coolant-distribution channels 7 and 8 are closable by suitable wedges 9. According to the illustrated embodiment, two adjacent or neighboring winding coils are associated with each coolant distribution channel, the channels being alternatingly constructed as coolant supply channels 8 and coolant discharge channels 7. The coolant guidance can also be seen especially from the perspective view of FIG. 2, wherein the slotted support cylinder 1 is shown with a slot insulation lining 10 and the slot-closing wedges 4, but without the winding coils 3 and without the bracing cylinder 5 which absorbs the centrifugal forces. The flow of the cold coolant is represented by solid-line arrows and that of the heated coolant by broken-line arrows in FIG. 2.

Figure 3:
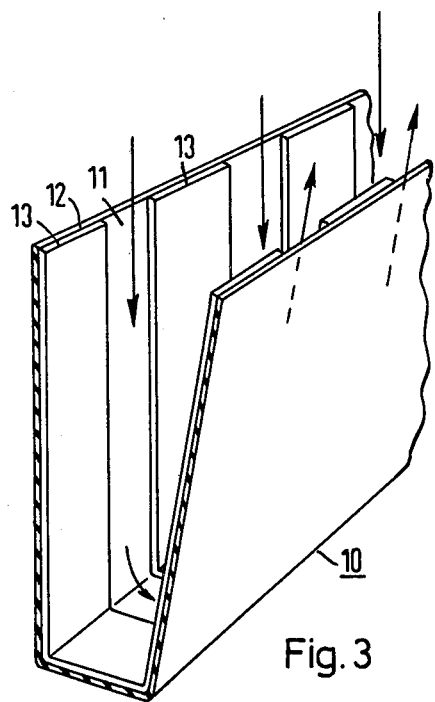
FIG. 3 is a perspective view of the slot lining formed with coolant channels.

Radially extending cooling channels 11 according to the illustrated embodiment for proper cooling of the winding coils 3 are formed on the inside of the slot lining 10, so that the cooling channels thereby open toward the winding coils 3. This slot lining 10, as is seen especially from FIG. 3, can be formed of two U-shaped slot insulation angles 12 and 13. The outer slot angle 12 extends along the entire coil length, while on the inner side thereof narrower slot angle members 13 can, for example, be disposed thereon at relatively short distance one from another in axial direction and hardened in common so that they form a mechanical compact unit. By this method the coil-cooling channels 11 can be produced in a relatively simple manner with relatively great dimensional accuracy.

Figure 2:
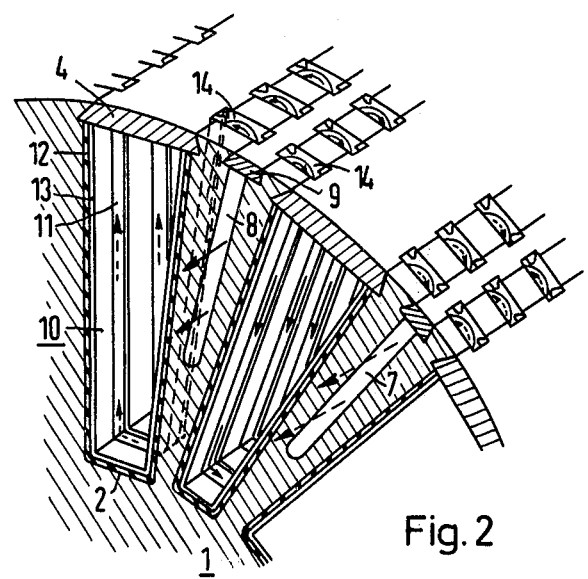
FIG. 2 is a perspective view of a support cylinder segment with the bracing cylinder normally shrink-fitted thereon removed therefrom and without any winding inserted therein so as to illustrate the flow of the coolant better.

To connect the cooling channels 11 and the coolant distribution channels 8 and 7 with each other, incisions 14 are formed at the outer end of the teeth 6 as can be seen especially from FIG. 2. The incisions 14 are then covered by the shrink-fitted bracing cylinder 5. Advantageously, the edges of the slot-closing wedges 4 or of the wedges 9 for the coolant distribution channels 8 and 7 are provided with corresponding incisions 15 or 16. The cold coolant flowing through the coolant supply channel 8, as indicated by the arrows, first flows radially outwardly and then through the incisions 14 into the cooling channels 11 per se. In the latter, the coolant is then conducted over the entire periphery of a winding coil 3. The thus-heated coolant then flows in analogous manner through further corresponding incisions into the coolant discharge channel 7. As can be seen readily from the flow-indicating arrows, the cooling medium or coolant flows from the coolant supply channel 8 on both sides to the two adjacent or neighboring slots; in a similar manner, a coolant discharge channel 7 also receives the heated cooling medium, which stems from the two neighboring winding coils.

Figure 4:
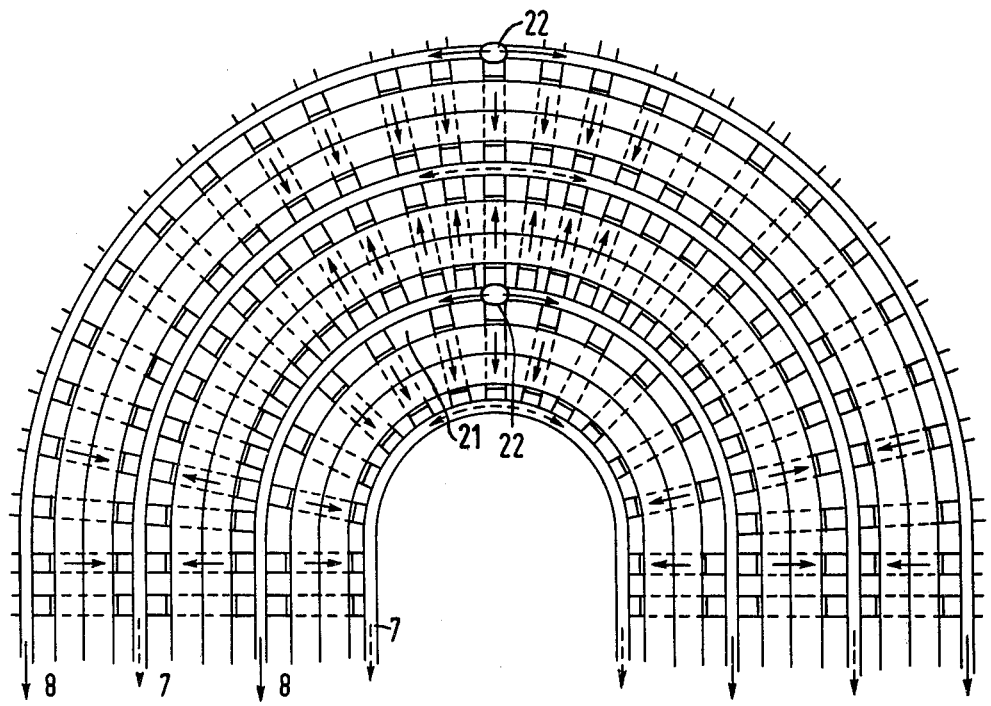
FIG. 4 is a diagrammatic developed plan view of a winding head with an appropriate coolant guidance.
Figure 5:
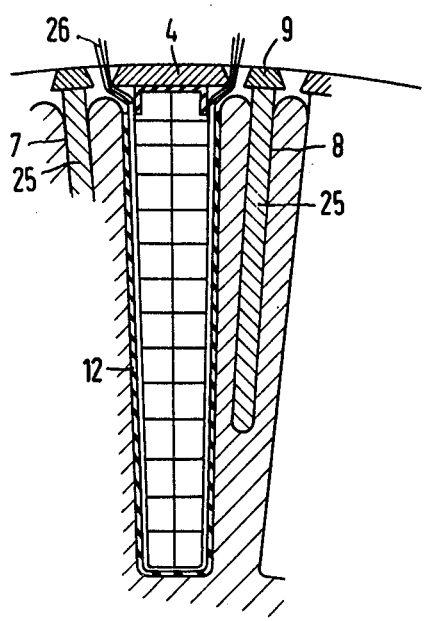
FIG. 5 is a partial cross-sectional view of a region of a slot with filler strips inserted into the cooling channels during the impregnating and hardening of the winding.

The aforedescribed radial cooling is also employed in an analogous manner in the winding heads of the rotor. An embodiment thereof is shown schematically in FIG. 4. The winding head can thus be constructed of semicircular coils 20, the filler members 21 disposed in the spaces between the coils being insertable therein at a high tolerance accuracy or accuracy of fit. The coolant supply and discharge channels 7 and 8 incised or milled into the teeth 6 of the rotor support cylinder are also provided in in similar manner in the winding-head filler members 21, through which the coils 20 are supplied with coolant in a multiplicity of parallel branches. All of the coolant of the rotor is accordingly supplied in or through the winding head. Through radial channels 22 formed in the pole center, the coolant travels initially into the coolant supply channels 8 and, upon flowing therethrough is discharged in a similar manner into the coolant discharge channels 7 at the oppositely disposed winding head. In the aforedescribed disposition and construction of the winding, it is especially advantageous if the winding coils, after the insertion thereof into the slots, are impregnated with resin, such as epoxy, and hardened, so that the entire winding is bonded into a mechanically stable an rigid block. In order to implement such an impregnation of the installed winding, it is necessary, however, to fill all of the cooling channels with filler members prior to the impregnation. As can be seen from FIG. 5, the coolant supply and discharge channels 7 and 8 are filled with steel strips 25, while lameller steel bands 26 are insertable into the radical cooling channels 11 prior to insertion of the winding coils. The lamellar bands 26, which are formed of a multiplicity of thin steel strips, have a minimal characteristic stiffness and can be easily withdrawn after the hardening process is completed and after removal of the wedges from the slots. Prior to the insertion of the steel strips 25 and the steel lamellar bands 26, they, as well as the slot wedges 4 and 9, are advantageously coated with a suitable conventional resin-repelling anti-adhesive medium. The milling of the edges of the slot-closing wedges is advantageously effected only after the hardening process has been completed and the wedges removed.

Through the aforedescribed construction and disposition of the cooling channels and the guidance of the coolant, the following essential advantages are derived: Since the coolant supply and discharge channels have a relatively large cross-section, the resistance to flow in these channels is negligibly small. The flow around the individual winding coils in radial direction results therefore in a very short cooling path and thereby in only a minimal loss of flow, which is advantageous for the cooling of the winding. Due to these characteristics, a higher cooling output is attainable with this cooling system than with an axial cooling system. Moreover, with such a coolant guidance, an undisturbed large-area support for the winding is attained within the entire coil union. The individual windings of the winding coils are fully supported in the direction of main stress, namely in radially outward direction. Consequently there are no discontinuities in the winding insulation. Discontinuities in the support for the coils occur at the side flanks and at the bottom of the slots. Since no high mechanical stresses are present at these locations, however, these support discontinuities can be readily controlled.

Due to the aforedescribed cooling arrangement, a complete vacuum-impregnation and hardening of the entire coil assembly after the insertion thereof into the support cylinder is possible, furthermore. The coil windings are thereby baked together to a firm and rigid assembly free of play, which is of considerable significance for the operational reliability of the very sensitive superconductors.

I claim:

1. Cooling system for a superconductive exciter winding in a turbogenerator rotor, the exciter winding having winding coils formed of a multiplicity of individual windings that are received in slots formed at the outer periphery of a solid support cylinder and retained therein by a bracing cylinder shrink-fitted on the support cylinder, comprising coolant distribution channels disposed radially in teeth located between and defining the slots formed in the support cylinder and in filler members located between winding head coils, said coolant distribution channels surrounding the individual windings over the entire length thereof and being connected in peripheral direction on both sides thereof with coolant channels extending substantially parallel to one another in radial direction with the individual winding coils and surrounding the same at the bottom of the slots.

2. Cooling system according to claim 1 wherein said coolant distribution channels, along the periphery of said support cylinder, are alternatingly constructed as coolant supply channels and coolant discharge channels.

3. Cooling system according to claim 1 wherein said coolant channels surrounding said winding coils are formed at the inner side of a U-shaped lining of said slots.

4. Cooling system according to claim 1 wherein said slots are closed by slot-locking wedges at the periphery of said support cylinder, and wherein said radially extending coolant distribution channels are connected through radial incisions formed at the periphery of said support cylinder and at edges of said slot-locking wedges to said coolant channels surrounding said winding coils.

* * * * *